United States Patent [19]
Ikuma et al.

[11] Patent Number: 5,733,580
[45] Date of Patent: Mar. 31, 1998

[54] DIES FOR EXTRUSION MOULDING

[75] Inventors: Ken Ikuma; Masaaki Sakata; Koji Akioka; Tatsuya Smimoda, all of Nagano-Ken, Japan

[73] Assignee: Seiko Epson Corporation, Tokyo, Japan

[21] Appl. No.: 608,035

[22] Filed: Feb. 28, 1996

Related U.S. Application Data

[63] Continuation of Ser. No. 180,817, Jan. 10, 1994, abandoned, which is a continuation of Ser. No. 82,513, Jun. 25, 1993, abandoned, which is a continuation of Ser. No. 891,922, Jun. 1, 1992, abandoned, which is a continuation of Ser. No. 508,711, Apr. 13, 1990, abandoned.

[51] Int. Cl.$^6$ ............................ B29C 47/20; H01F 41/02
[52] U.S. Cl. .................... 425/3; 264/429; 264/DIG. 58; 425/380; 425/461; 425/467; 425/DIG. 33
[58] Field of Search ........................ 264/24, 108, DIG. 58, 264/427, 429; 425/3, 174, 174.8 R, 380, 404, 445, 446, 461, 467, DIG. 33

[56] References Cited

U.S. PATENT DOCUMENTS

| | | | |
|---|---|---|---|
| 3,387,066 | 6/1968 | Martin et al. | 264/24 |
| 3,732,617 | 5/1973 | Rowe et al. | 264/24 |
| 3,918,867 | 11/1975 | Beyer | 264/108 |
| 3,981,653 | 9/1976 | Greenhalgh et al. | 425/378.1 |
| 4,150,927 | 4/1979 | Steingroever | 425/174.8 R |
| 4,604,042 | 8/1986 | Tanigawa et al. | 264/24 |

FOREIGN PATENT DOCUMENTS

| | | |
|---|---|---|
| 0149335 | 7/1985 | European Pat. Off. . |
| 0191130 | 8/1986 | European Pat. Off. . |
| 1169708 | 1/1959 | France . |
| 62-25410 | 2/1987 | Japan .................. 264/DIG. 58 |
| 62-30305 | 2/1987 | Japan . |
| 62-186509 | 8/1987 | Japan .................. 425/DIG. 33 |
| 63-102918 | 5/1988 | Japan . |
| 63-254713 | 10/1988 | Japan . |
| 1177454 | 1/1970 | United Kingdom . |

*Primary Examiner*—James P. Mackey
*Attorney, Agent, or Firm*—Cushman Darby & Cushman Intellectual Property Group of Pillsbury Madison & Sutro LLP

[57] ABSTRACT

A die for extrusion molding a resin bonding magnet. In the production of the magnet, a molten mixture of a magnetic powder and a resin are introduced into a cavity between an outer die and a mandril to which a magnetic field is applied. A steep temperature gradient along the die axis direction of the molten mixture and the cavity is achieved by making the outer die of a multiple layer structure along the die axis direction, utilizing two or more axially adjacent blocks or sheets made of the same or different materials whereby fluidity of the molten mixture is sufficiently high at the inlet of the cavity to enable the magnetic powder in the molten mixture to be sufficiently orientated in the direction of the magnetic field and then the molten mixture is cooled to a solidified state so that the orientation of the magnetic powder is not disturbed, thereby producing a magnetic having high magnetic properties.

4 Claims, 7 Drawing Sheets

102a: MOULDING SECTION OUTER DIE.
102b: INLET OF THE ORIENTATION SECTION.
102c: OUTLET OF THE ORIENTATION SECTION.

102a: MOULDING SECTION OUTER DIE.
102b: INLET OF THE ORIENTATION SECTION.
102c: OUTLET OF THE ORIENTATION SECTION.

110: ORIENTATING SECTION.
111: CONVERGING SECTION.
112: HEAT INSULATING SECTION.
113: HEATING SECTION.
 Z : TEMPERATURE MEASUREMENT POINT.

201: RAW MATERIAL INJECTION OUTER DIE.
202: MOULDING SECTION OUTER DIE.
203: MANDREL.
204: ELECTROMAGNETIC COIL.
205: MAGNETIC MATERIAL BLOCK.

201 : RAW MATERIAL INJECTION OUTER DIE.
202a, 202b : MOULDING SECTION OUTER DIE.
203a, 203b : MANDREL.
204 : ELECTROMAGNETIC COIL.
205 : CONNECTION SCREW.
206 : RAW MATERIAL INJECTION SECTION.
207 : RAW MATERIAL PACKING SPACE.

DIES FOR EXTRUSION MOULDING

This is a continuation of application Ser. No. 8/180,817, filed on Jan. 10, 1994, which was abandoned upon the filing hereof; which is a continuation of 08/082,513 filed Jun. 25, 1993, now abandoned; which is a continuation of 07/891,922 filed Jun. 1, 1992, now abandoned; which is a continuation of 07/508,711 filed Apr. 13, 1990, now abandoned.

BACKGROUND OF THE INVENTION

1. Field of the Invention

This invention relates to dies for an extrusion molding, especially for dies for an extrusion molding of a resin bound type magnet.

2. Description of the Related Art

In general, a resin bound type magnet is produced by a process shown in FIG. 6, ie:

A magnetic powder and an organic resin (thermosetting or thermoplastic resin) of suitable particle sizes are sufficiently mixed. If necessary, additives are added. The mixed raw materials are kneaded by a kneading machine such as a roller mill or an extrusion kneader, etc. with heating above a temperature at which the organic resin is molten. The kneaded raw material is roughly crushed into particles having particle sizes of around 1–10 mm, and is charged into an extrusion molding machine.

The charged magnet raw material is heated in the extrusion moulding machine to a fluidized state, and is sent into a die equipped at a front end of a cylinder by screw or plunger.

The magnet raw material is molded in a predetermined shape such as cylinder, thin plate, bar, etc. by passing it through the die. However, the molding processes of an isotropic magnet and an anisotropic magnet are different.

Namely, in case of the anisotropic magnet, an axis of easy magnetization of the magnetic powder in the raw material is in the magnetic field direction ie the magnetic powder is orientated, by passing the magnetic raw material through a die to which the magnetic field is charged, and it is molded. In the process, it is common to charge the magnetic field by a combination of an electromagnetic coil and a magnetic circuit comprising a magnetic material.

On the other hand, the isotropic magnet is molded by the extrusion without charging the magnetic field. The molded body is cooled near the outlet of the front end of the die, then it is picked up by a receiving machine located in front of the extrusion molding machine, and it is cut into a suitable length by a cutter.

Because the magnetism remains in the molded body in case of the molding with an orientation of the magnetic powder, it is subjected to a demagnetization to remove it. Further in case that the thermosetting resin is used as a binder, the molded body is subjected to a curing process to cure the resin after its demagnetization, and the resin bound type magnet by an extrusion molding is produced.

In these magnet productions, the die, which is used for an extrusion molding in a magnetic field (ie it is used for a molding of the anisotropic magnet), has a structure which is a combination of a magnetic material and a non-magnetic material, and they are disclosed in Japan Patent Laid-Open Sho 58-219705, Japan Patent Laid-Open Sho 60-100413, etc.

For example, in the Japan Patent Laid-Open Sho 58-219705, a die structure shown in FIG. 7 is disclosed.

In the die of FIG. 7, a raw material injection outer die 201, a mandral 203 and a front end of the molding section outer die 202 comprise magnetic materials and the rest of the molding section outer die 202 comprises a non-magnetic material. It is consituted that an electromagnetic coil 204 is coiled around the molding section outer die 202, and further a magnetic material block 205 is positioned around the electromagnetic coil 204.

The inventor of this application, etc disclosed a die structure as shown in FIG. 8 by Japan Patent Laid-Open Sho 63-254713.

The die is constituted by a outer die comprising a raw material injection outer die 201 and molding section outer dies 202a and 202b, and mandrels 203a and 203b. The raw material injection outer die 201 consists of a non-magnetic material, and the molding section outer die 202a also consists of a non-magnetic material, but it is equipped with the molding section outer die 202b made of a magnetic material to induce magnetic flux to the front end of the outer die.

The mandrel 203a also consists of a non-magnetic material, and at its front end of the mandrel, the mandrel 203b made of a magnetic material is provided.

The electromagnetic coil 204 is installed at the outside of the die. When a current is passed through the electromagnetic coil 204, a radiated magnetic field is charged at a space (hereinafter called as an orientation section) between the front end of the mandrel 203b and the front end of the molding section outer die 202b because the generated magnetic flux tends to pass through in a magnetic material with a high magnetic permeability.

A magnet raw material passes through the raw material injection section 206 and a raw material packing space 207 and it is molded in a cylindrial form by an extrusion with a progress of a radiatedly orientation of the magnet powder in the orientation section.

Today, (1) a press molding, (2) an injection molding and (3) an extrusion molding are available for a resin bound type radial magnet.

Among them, the press molding and the injection molding are currently utilized for mass-production processes. On the contrary, though the extrusion molding is widely applied for a molding of a ferrite magnet, it is still in a stage not to be utilized in a mass-production of a high performance rare earth magnet, and the die for the extrusion molding, especially a structure of the orientation section in the die has not be sufficiently considered.

SUMMARY OF THE INVENTION

It is important to have a sufficient consideration on the structure of the orientation section of a die for the extrusion molding because it largely influences a magnetic performance of the molded magnet.

In either the die or the machine of the extrusion molding for a resin bound type magnet, coventionally used, no attention has been paid on a material and a structure of the orientation section of the die, and it was generally made by a single body of a magnetic material. Therefore it has problems listed below.

Namely, in case that a resin bound type magnet is molded by extrusion, a magnetic field is charged, when a mixture comprising a magnetic powder and a thermosetting or thermoplastic resin becomes a molten state by heating, to orientate the magnetic powder, and it is necessary to carry out a solidification by cooling after the molding in the orientation section not to disorder the orientation and the molded shape.

In order to achieve a sufficient orientation of the magnetic powder, it is preferable that a viscosity of the resin should be as low as possible as soon as it enters the orientation section, ie its temperature should be as high as possible. On the contrary, when the magnet orientated and molded comes out from the die, it is preferable that its temperature is as low as possible to get a sufficient solidification by cooling in the orientation section not to disorder the orientation and the molded shape.

Accordingly a temperature gradient is required in the orientation section. If the temperature gradient is not sufficiently taken in the orientation section for the solidification by cooling and the temperature of the whole orientation section drops, it results are insufficient orientation, and adversely if the temperature of the whole orientation section rises, the orientation and the molded shape are disordered when the magnet comes out from the die.

However, in case that the orientation section comprises a single body of a magnetic material, it is difficult to take the temperature gradient because of the property of the material and the structure of the orientation section, and in order to take the temperature gradient in the single metal body, it is necessary to equip a heater and a cooler with a high capacity resulting an extreme inefficiency.

Further, in case of a cylindrical magnet with anisotropy radiatedly toward its diameter direction (hereinafter called as a radial anisotropic magnet), the sufficiency of its radial anisotropic property depends on a shape and a size of the magnet. As an index to show the above, a radial factor fR is given by the following equation.

$$fR = 2\, Dh/d^2$$

where D=Outer diamter of a ring shaped molded magnet
h=Height of a ring shaped molded magnet
d=inner diameter of a ring shaped molded magnet
and the raidal factor can be classified into folliwng categories.

| | |
|---|---|
| fR < 1 | Sufficient radial achievable |
| fR = 1–2 | Insufficient |
| fR > 1 | Isotropic |

The fR is the first index to consider at designing of a die when a radial magnetic field molding by a pressing or an injection is practiced.

Namely, if the die structure satisfies fR<1, a sufficient radial magnetic field can be charged at a cavity and thus it is possible to mold a magnet with a sufficient radial anisotropic property.

However when a die of fR≧1 is designed, it is not possible to mold a magnet with a sufficient radial orientation.

Therefore there is an important index for the designing of a die for a radial magnetic field molding by a pressing or an injection.

However in case of extrusion molding, since a shape of a molded magnet and a die for extrusion molding do not coincide, and thus it is difficult to use fR as it is for designing of a die for extrusion molding.

As described above, when a resin bound type magnet is molded by extrusion, a mixture of a magnetic powder and a thermosetting or a thermoplastic resin is heated, a magnetic powder is orientated by charging a magnetic field as it becomes a molten state, and a solidification by cooling after molding should be performed in the orientation section not to disorder the orientation and the molded shape.

In order to achieve a sufficient orientation of the magnetic powder, the temperature gradient in the orientation is required as described above. To get the temperature gradient in the orientation section, there are below-listed methods.

(1) Increasing the length of the orientation section, (2) Inserting a material with a low thermal conductivety into the orientation section and (3) Heating and cooling of both ends of the orientation section with extremely strong heater and cooler.

Among them, as to (1) the length of the orientation section, there is a limitation of the length of the orientation section because of an impossibility of a sufficient orientation magnetic field if it becomes too long, and as to (2), a material of low thermal conductively is in general a non-magnetic material, and thus the magnetic field in the orientation is disordered unless the material inserted is thin.

Accordingly both of (1) and (2), though it may be possible to attain the temperature gradient with a reduction of the capacities of the heater and the cooler, still require a strong heater and cooler to get the temperature gradient as same to (3) in a certain degree.

However if a strong heater with an additional capacity is used, not only the orientation section, but also the whole of the die is heated resulting an temperature elevation of the whole of the die except for the front end of the die. Therefore a compound, which is heated to have a fluidity in the extrusion machine, is further heated in the die, in case that a resin in the compound is a thermosetting resin, it starts to cure in the die, and case of a thermoplastic resin, a thermal decomposition is initiated resulting changes by time such as an increase of viscosity of the compound while it is in the extrution molding process, etc. They lead to a problem that a long time stable operation of the extrusion molding is not achieved.

This invention aims to solve the problems of the die for extrusion molding of a resin bound type magnet as discussed above, and to provide a die for the extrusion molding to mold a resin bound type magnet with a high performance and a superior shape accuracy.

Further, this invention provides a die for extrusion molding to produce a high performance resin bound type radial magnet and to produce a long size radial magnet which does not satifsy fR<1.

Furthermore, this invention aims to provide a die for an extrusion molding, by which a long time stable extrusion molding can be operated by preventing the changes of a resin and a magnetic powder by time during the extrusion and by stabilizing the magnetic performance of a magnet to be molded with a superior mass production capability as well.

DETAILED DESCRIPTION OF THE EXEMPLARY EMBODIMENTS

Figure 1:
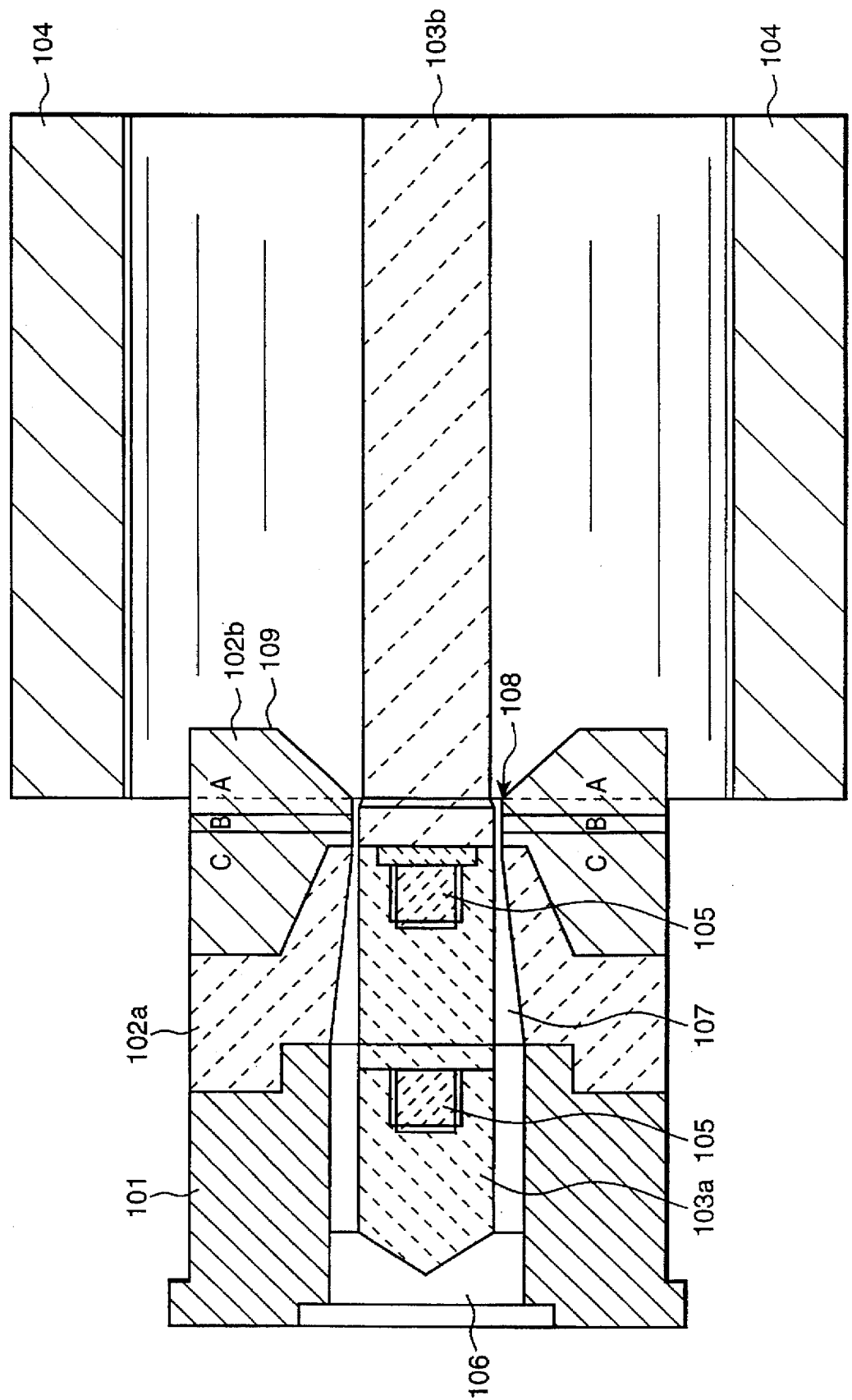
FIG. 1–3 show outline drawings of dies for extrusion molding used in Examples of this invention.

This invention is a die for extrusion molding of a resin bound type magnet which is molded by an orientation of a molten mixture of a magnetic powder and a resin and by a solidification with cooling, wherein an orientation section, which is from an orientating section of the said magnetic powder at the front end of the said die by charging a magnetic field to the die section, is formed by a layer structure comprising at least one or more of different materials.

It is a die for extrusion molding wherein at least one or more of the materials of the orientation section comprises magnetic material(s).

Further, it is a die for extrusion molding wherein the layer structure is formed by inserting a low thermal conductively material of which the thermal conductively K (20° C.) is $$K \leq 0.01 \text{ [cal/cm·sec·°C.]}$$

into a partial section of the said orientation section.

Further, it is a die for extrusion molding wherein the material of the insertion into the orientation section of the die for extrusion molding comprises a non-magnetic material and the thickness of the said non-magnetic material is ½ or less of the contact section length of the molten mixture in the orientation section.

Furthermore the die for extrusion molding is applied for a cylindrical resin bound type magnet.

Also this invention is a die for extrusion molding for producing the aforementioned cylindrical resin bound type magnet, wherein the contact section length l of the orientation section with a molten mixture from a section from which the orientation of the aforementioned magnetic powder starts by charging a magnetic field at the front end of the said die to the outlet section of the die satisfies $$l < d^2/2D.$$

(d and D are inner and outer diameters of the molten mixture passage, respectively)

Furthermore, in the die for use in extrusion moulding a non-magnetic material may be present in the orientation section of the die as a middle layer or layers surrounded by a magnetic material and in this case the total axial length L' (mm) of the magnetic material l' satisfies the relationship l'>d²/2D where d and D are the inner diameter and the outer diameter of the cavity of the orientation section, respectively.

Furthermore it is a die for extrusion molding wherein the aforementioned magnetic powder comprises a ferromagnetic material consisting of rare earth elements (including Y) and transition metals mainly constituting cobalt, or a ferromagnetic material consisting of rare earth element, transition metals mainly constituting iron and boron.

Further this invention is a die for extrution molding a resin bound type magnet which is molded by an orientation of a molten mixture of a magnetic powder and a resin, an by a solidification with cooling wherein the structure of the die is constituted in orders from a connection section of an extrusion machine to an outlet of the orientation section as (a) A converging section where a mixture of a magnetic powder and a resin which is in a molten state with a fluidity is pressed into the final shape.

(b) A heat-insulating section to hold a temperature difference between a front part and a rear part of the die.

(c) A heating section by which the viscosity of the molten compound of the mixture in a molten state is further reduced.

(d) An orientating section in which a magnetic field is charged, the magnetic powder is orientated and it is solidifed with cooling as its state.

This invention has effects to improve the performance of the molded magnet and also to reform the dimensional accuracy as it is clear from the aftermentioned Examples as a result of formation of an temperature gradient in the orientation section, by forming a layer structure with at least one or more different materials and by making at least one or more of materials of the said orientation section with magnetic materials, which is from the front end of the die at which the orientation of a magnetic powder starts to an outlet section of the die for extrusion molding a resin bound type magnet which is moulded by orientating a molten mixture of a magnetic powder and a resin, and by a solidification with cooling.

Also in this invention, as one alternative case of the layer structure in the orientation section, when a material with a low thermal conductivity having the thermal conductivity K (20° C.) of K≦0.01 [cal/cm·sec·°C.] is inserted, the thermal conductivity at the insertion section drops approximately ¹⁄₁₀ or less because a material generally used for the die has the thermal conductivity of approximately 0.07–0.08 [cal/cm·sec·°C.].

If a heat passing through the orientation section is constant, a temperature difference is able to be attained by the below listed equation by reducing the thermal conductivity.

$$Q = A \cdot K \ (T_1 - T_2)/l$$

Q: heat capacity, A: area, l: thichkenss
$T_1 - T_2 = \Delta T$: temperature difference Further, in case that the insertion material in the orientation section comprises a non-magnetic material, the magnetic performance remarkably deteriorates if it is ½ or more of the length of the orientation section, in spite of a high temperature difference. Thus was due to an disorder of the magnetic field in the orientation section by insertion of a non-magnetic material in the orientation section. Although the temperature difference drops when a non-magnetic layer becomes thin, the magnetic performance is somewhat improved because of a reduction of the disorder of the magnetic field in the orientation section. Therefore it is preferable that the thickness of the non-magnetic layer is as thin as possible to take a sufficient temperature gradient, and when a non-magnetic material is inserted, it is preferable that its length is ½ or less of the length of the orientation section.

Moreover by this invention, when the contact section length l of the orientation section of the die for an extrusion with the molten mixture is limited as L<d²/2D, the magnetic performance is improved because of an availability of a sufficient orientation of the magnetic powder.

Further by arranging the composition of the die structure from the connecting section of an extrusion machine to the outlet of the orientation section in order of a converging section, a heat insulating section, a heating section and an orientating section, it is able to operate a stable extrusion molding over a long time resulting effects such as a suitability for a mass production, etc.

According to this invention, (1) It is possible to take a temperature gradient in the orientation section by forming a layer structure for the orientation section, and therefore the degree of the orientation of a magnet is improved and the dimensional accuracy is also reformed.

(2) It is possible to take a further high temperature gradient in the orientation section, by inserting a magnetic material of its thermal conductivity of 0.01 [cal/cm·sec·°C.]

or less or a non-magnetic material which has a thermal conductivity of 0.01 [cal/cm·sec·°C.] or less having a length not more than ½ of the length of the orientation section, into a partial section of the orientation section, and therefore it is able to mold a high performance anisotropic resin bound type magnet by extrusion molding.

(3) In case that a non-magnetic material is not present in the orientation section, by making the length l of the orientation section as $l < d^2/(2D)$ and in case that a non-magnetic material is present, by making the length l'

$l' < d^2/(2D)$ it is able to mold a high performance resin bound type radial magnet with a sufficient radial orientation and to achieve prolongation of this magnet.

Figure 3:
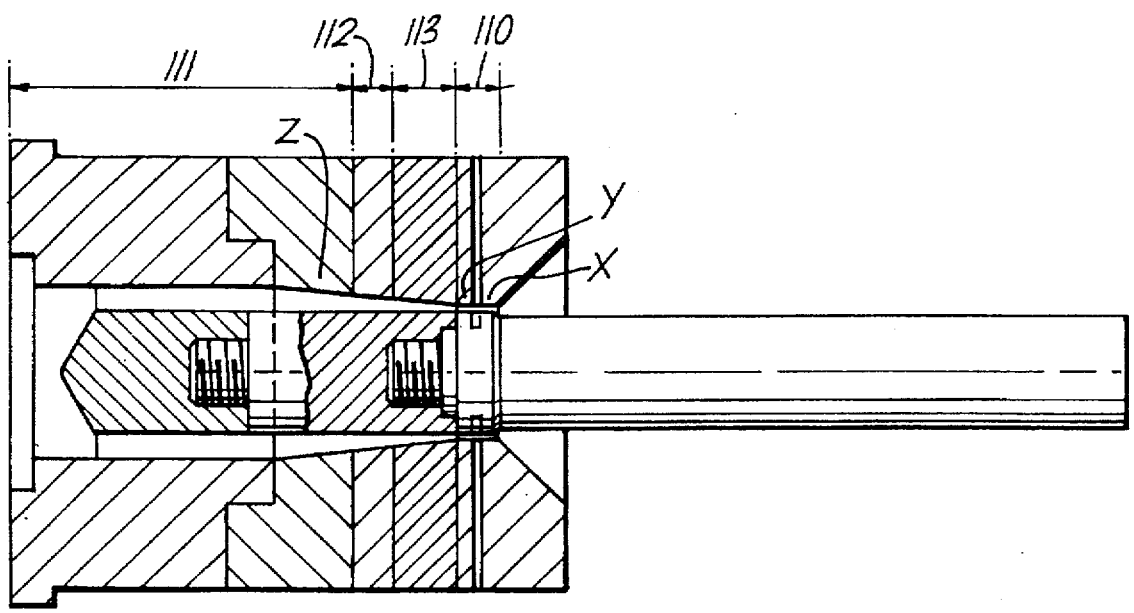

(4) By constituting a structure of the die, as shown in FIG. 3, in order from a connecting section of an extrusion machine as a coverging section, a heat insulating section, a heating section and an orientating section, it is able to operate extrusion molding with a stable magnetic performance for a long time, and a stable mass production is achievable.

This invention is hereafter explained by using Examples.

EXAMPLE 1

FIG. 1 shows outline drawing of a die for extrusion molding used in Example 1.

In Figure, 108 is the orientation section, 109 is a surface of the outlet of the orientation section, X and Y are temperature measurement points, and an explanation of other numbers is omitted because they are described in below.

A die for extrusion molding for a practice of this invention is constituted, as shown in FIG. 1 by a outer die comprising a raw material injection outer die 101 and molding section outer dies 102a and 102b, and mandrels 103a and 103b, the raw material injection outer die 101 and the molding section outer die 102a are composed of non-magnetic materials, and the molding section outer die 102b of a magnetic material is equipped at the front end of the outer die to induce a magnetic flux. Further the mandrel 103a comprises a non-magnetic material, and at its front end the mandrel 103b consisting of a magnetic material is equipped by a connection screw 105.

Further an electromagnetic coil 104 is installed at the outside of the die, and when a current passes through the electromagnetic coil, a radiated magnetic field is charged at the orientation section 108 between the front end of the mandrel 103b and the front end of the molding section outer die 102b because the generated magnetic flux tends to pass through a magnetic material with a high magnetic permeability.

Next, for a production of a magnet, a magnetic powder is mixed with an organic resin such as a thermosetting or a thermoplastic resin and when it is required with additives by a mixer.

The mixture of the magnetic powder and the resin is heated in an extrusion machine, and it becomes in a molten state. Then it, in state, is sent to the raw material injection section 106 of the die for extrusion molding.

The molten material of the magnetic powder and the resin poured is gradually converged while it is being passed through the raw materials packing space 107 in the die to mold the final shape. The magnetic powder is orientated in the orientation section 108, and it is molded in this state by a solidification with cooling in the orientation section 108.

Next in Table 1, results of measurements of temperature difference between X and Y points in the orientation section 108 are shown when the orientation section 108 is formed by a layer structure with materials selecting from at least one or more of several materials, namely, SKD 61: JIS G 4404 specification, steel material
SKD 11: JIS G 4404 specification, steel material
SiO2: oxide of silicon
PES: polyethersulphone resin for the structure of the orientation section of a die for extrusion molding.

The total length of the orientation section 108, by the way is, 6 mm, and the temperature differences represent temperature differences between X and Y points which are 0.5 mm from the both ends of the orientation section 108, respectively and are 3 mm outside from the passage of a molten mixture of the magnetic powder and the resin. (In the measurement, the temperature at Y point was fixed at 50° C.)

A heater with 800 W capacity was used for heating, and a cooling plate by a water cooling was installed at the surface of the outlet of the orientation section 109 for cooling to cool the orientation section 108.

The structure column in Table 1 shows materials used for the front end structure, and among them, SKD 61 and SKD 11 are magnetic materials and the remainders $SiO_2$ and PES are non-magnetic materials.

Further the length of each layer is 6/A [mm]. (A means number of the layers.)

As shown in Table 1, in case of Comparative Test in which the orientation section was formed by a single metal, a temperature difference of only 20° C. was obtained with the aforementioned system. Although it was the same material, the temperature gradient was however able to get by forming the layer structure.

This was because that the contact surface resisted the heat transfer by forming the layer structure. This was also proved by Test 1 and Test 4.

Further as it was understood from Test 3, 5 and 6, a further high temperature gradient was attainable by using a material of the low thermal conductivity for a partial section of the orientation section.

However, in this case, since a magnetic material has, in general, high thermal conductivity, a non-magnetic material becomes suitable for the aforementioned material and it is unfavorable to get the magnetic field.

Next Table 1 also shows magnetic performance of magnets molded by the dies having their structures as described above.

The magnets were produced by following process.

For the magnets produced here, a magnetic alloy of its coercive force at approximately 7 KOe having a basic magnetic powder composition of Sm (Co 0.672 Cu 0.08 Fe 0.22 Zr 0.028) 8.35 was crushed into particles of the average particle size of approximately 20 μm, and they were mixed with a resin. A ratio of the magnetic powder and the resin was the magnetic powder 60 vol % and the resin 40 vol %.

A thermosetting resin mainly comprising an epoxy resin was used as the organic resin.

The aforementioned mixture was kneaded by a roller mill, a compound was prepared, then the compound was coarsely crushed, and it was charged in a screw type extrusion machine. The crushed compound was heated in the extrusion machine.

The thermosetting resin mainly comprising the epoxy resin had its thermoplastic region at approximately 100°–150° C. at which the viscosity remarkably dropped, the mixture of the magnetic powder and the resin made in a molten state in this temperature region, it was pushed into a die by the screw, and a magnet was extruded from the die by a solidification with cooling after orientating the magnetic powder in the orientation section at the front end of the die. The shape of the molded magnet was a ring shaped with the outer diameter 32.8 mm and the inner diameter 31.8 mm.

In this Example, the magnetic performance was measured by using an uncured state magnet molded in a molten state.

As it is clear from Table 1, the molded magnet showed an improved performance in case a die structure by which the temperature gradient was secured, and it was also confirmed that the dimension accuracy was improved by having the temperature gradient as well.

TABLE 1

| Code | Structure | Temp difference | Magnetic Property Br[KG] | (BH) [MGOe] max | Dimension Accuracy |
|---|---|---|---|---|---|
| Test 1 | SKD61/SKD61 | 30° C. | 5.54 | 6.3 | C |
| Test 2 | SKD61/SKD11 | 35° C. | 5.60 | 6.5 | C |
| Test 3 | SKD61/SiO$_2$ | 70° C. | 5.62 | 6.5 | B |
| Test 4 | SKD61/SKD11/SKD61 | 40° C. | 5.95 | 7.0 | C |
| Test 5 | SKD61/S1O$_2$/SKD61 | 100° C. | 6.15 | 8.0 | A |
| Test 6 | SKD61/PES/SKD61 | 150° C. | 6.30 | 8.5 | A |
| Comparative Test 1 | SKD61 | 20° C. | 5.36 | 6.0 | D |

A excellent
B good
C fair
D bad

EXAMPLE 2

Figure 2:
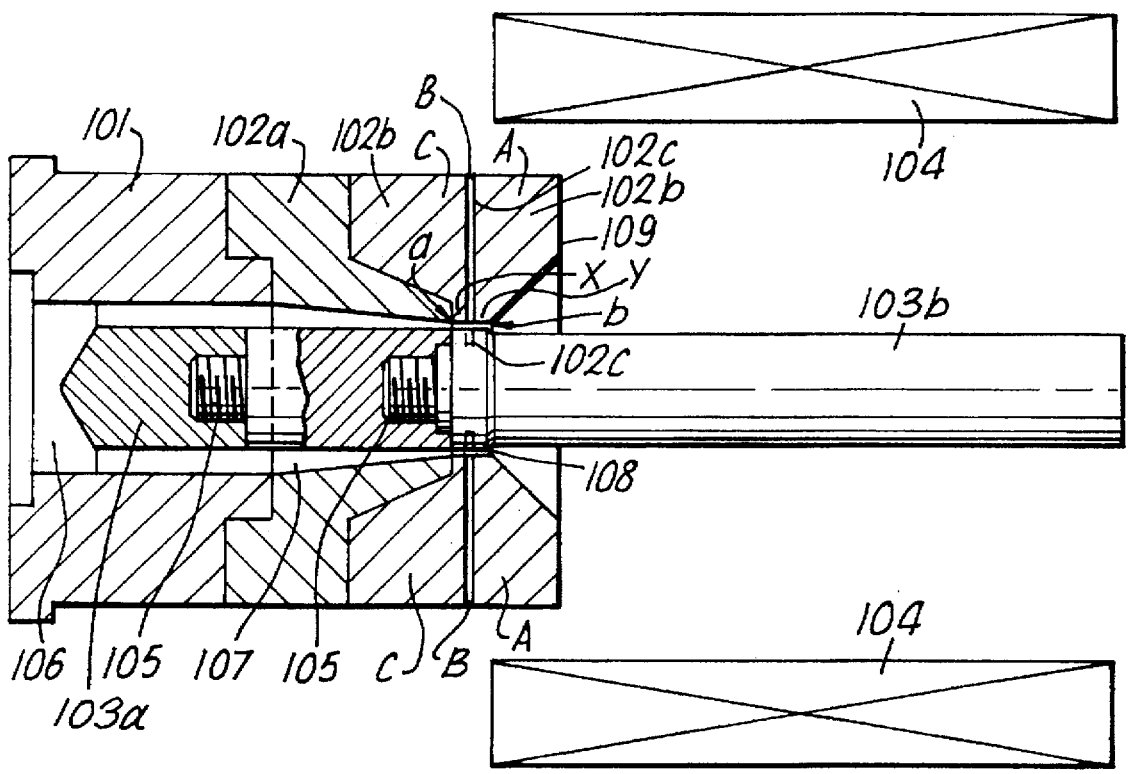

FIG. 2 shows an outline drawing of a die for extrusion molding used in Example 2.

In FIG. 2, 102c shows a molding section outer die comprising a material of a low thermal conductivity, a distance between a-b shows a length of an orientation section 108, and an explanation of the other figures is omitted because they are same to FIG. 1.

A die for extrusion molding for a practice of this invention is a die which possesses similar structure and effect as FIG. 1 except that a different material is inserted in the center of the orientation section 108, and the orientation section 108 at the inner part of the die has a structure divided into 3 layers ie A, B and C as shown in FIG. 2. In this case, layer B was a material of the inserted layer, and a same material ie SKS2 was used for layer A and layer C. SKS2 is a steel material specified by JIS G 4404 standard.

A temperature difference in the orientation section 108 showed a temperature difference between X and Y points shown as temperature measuring points in FIG. 2.

The temperature differences between X-Y, when several materials were used for the layer B material inserted, are shown in Table 2. The length of the orientation section [a distance between a-b in FIG. 2] was 6 mm, and all the lengths of every layer were 2 mm.

Figure 8:
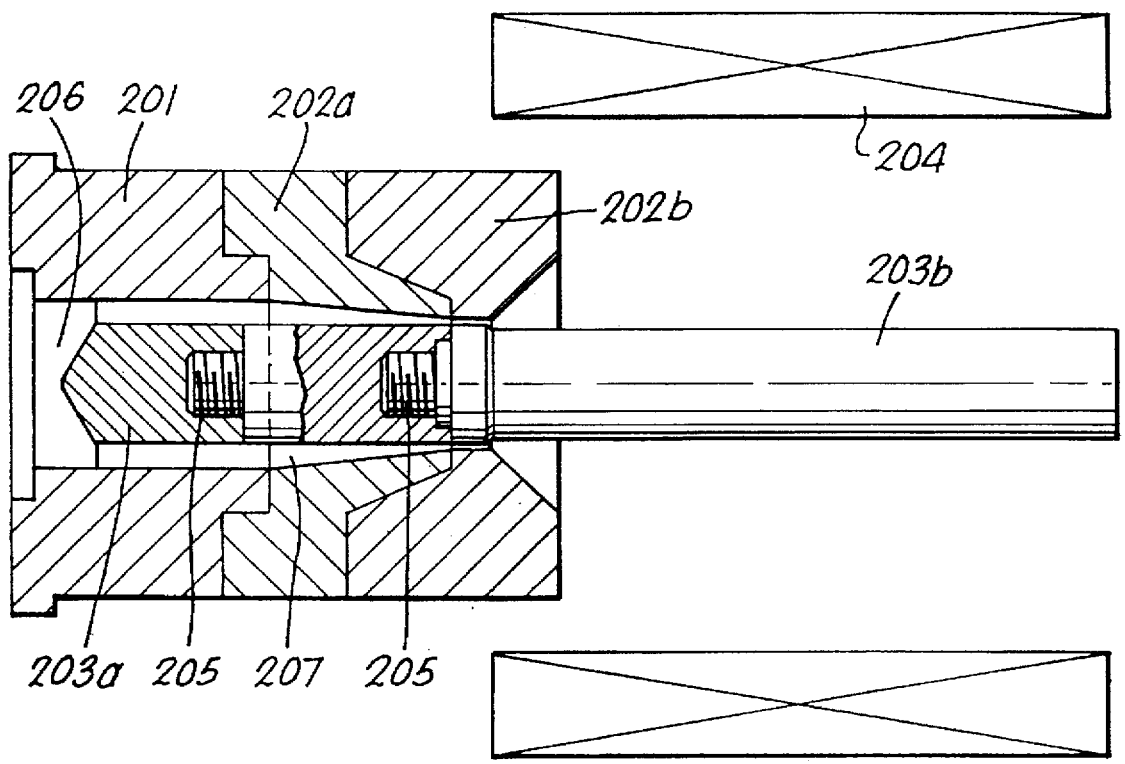

As to Comparative Test 2, it was an example by using a die of which the orientation layer was not constituted by the layer structure as shown in FIG. 8.

As same to Example 1, a heater with 800 W capacity was used for heating, and as for cooling, a surface of the outlet of the die in layer C 109 was cooled by water and the temperature at Y point was kept at 60° C.

Next, cylindrical magnets of the outer diameter 30 mm and the inner diameter 28 mm were molded in same basic composition and procedure as Example 1, by using the aforementioned die, and magnetic performance of their magnets was compared.

In Table 2, the temperature difference between X and Y in the orientation section 108 and the magnetic performance of the magnet prepared are shown when the orientation section 108 was formed by using a material as an inserting material selecting from, PES: polyesthersulphone resin
PEEK: polyetheretherketone resin
ZrO$_2$: oxide of zirconium
YHD50: steel material (a Hitachi Metal Product) and
SKD61: steel material specified by JIS G 4404 which had different thermal conductivities,

Test 7–11 and Comparative Test 2 were cases when a resin mainly comprising an epoxy resin was used, and the extrusion condition was that the extrusion was made by keeping the temperature at Y point at 60° C. as described above. The temperature was a temperature that the resin used was solidified, and the shape of the molded magnet did not deform.

On the other hand, for Test 8a–11a and Comparative Test 2a, a polyamide resin (Nylon 12) was used, and in this case, the extrusion was made by keeping the temperature at Y point at 160° C.

An example, which corresponds to Test 7 ie PES is used as a material to make the inserted layer, is not shown in Table 2, and this is due to an impossibility of the application because of a poor heat resistance of PES.

As shown in Table 2, the cases, in which materials of low thermal conductivity were inserted, uniformly exhibited better magnetic performance than Comparative Test 2 and 2a in which the orientation section was formed by only a single metal SKD61. However when the material inserted has the thermal conductivity (at 20° C.) above 0.01 [cal/cm·sec·°C.], the improvement on the magnetic performance is slight, and it is preferable to insert a material having the thermal conductivity of 0.01 [cal/cm·sec·°C.] or less.

TABLE 2

| Code | Material Inserted | Thermal Conductivity [cal/cm · sec · °C.] | Temp Difference [°C.] | Magnetic Performance Br[KG] | (BH) [MGOe] max |
|---|---|---|---|---|---|
| Test 7 | PES | 4.54 × 10$^{-4}$ | 105 | 6.30 | 8.5 |
| Test — | — | — | — | — | — |
| Test 8 | PEEK | 5.97 × 10$^{-4}$ | 100 | 6.28 | 8.4 |
| Test 8a | " | " | | 6.27 | 8.4 |
| Test 9 | ZrO$_2$ | 0.007 | 80 | 6.18 | 8.1 |
| Test 9a | " | " | | 6.15 | 8.0 |
| Test 10 | YHD50 | 0.038 | 40 | 5.65 | 6.6 |
| Test 10a | " | " | | 5.57 | 6.4 |
| Test 11 | SKD61 | 0.073 | 30 | 5.60 | 6.4 |
| Test 11a | " | " | | 5.50 | 6.3 |
| Comparative Test 2 | — | 0.073 | 25 | 5.36 | 6.0 |
| Test 2a | — | " | | 5.34 | 6.0 |

EXAMPLE 3

Next, an effect to a magnet, when a thickness of a non-magnetic material to be inserted in the orientation section in FIG. 1 was varied, was investigated.

PEEK was used as the material to be inserted, the length of the orientation section including the thickness of PEEK was always kept at 6 mm, layer A and layer C were made as the same length, and a cooling capacity was adjusted to make the temperature at Y point always at 160° C. Further as for a resin to be mixed with a magnetic powder, polyamide resin (Nylon 12) was used, and a moulding process and a shape of the moulded magnet were same as the aforementioned Example 2.

In Table 3, temperature difference between X-Y and magnetic performance are shown when the thickness of layer B was varied from 0.5 to 3.5 mm. (Test 12–16).

As it is clear from Table 3, the temperature difference is saturated at the PEEK thickness of 2 mm with the heater capacity used. Since the thermal conductivity of PEEK is extremely low, a temperature difference of around 80° C. is attained even at the PEEK thickness of 0.5 mm.

Further as understood from Table 3, when the PEEK thickness becomes 3 mm (½ of the length of the orientation section) or more, the magnetic property drops remarkably, though the temperature difference between X-Y is large. This is due to a disorder of a magnetic field in the orientation section by entering a non-magnetic material into the orientation section. Similarly even when the PEEK thickness is 1 mm or less, it is seen that the magnetic performance is somewhat improved in spite of a reduced temperature difference.

Although the temperature difference drops if the thickness of a non-magnetic layer becomes thin, it is observed that the magnetic performance is somewhat improved because of a decrease of the disorder of the magnetic field in the orientation section.

Basing on these observations, it is preferable that the non-magnetic layer should be as thin as possible if it is able to secure a sufficient temperature difference, and from the results of Table 3, it is preferable that it is ½ or less of the length of the orientation length when a non-magnetic material is inserted.

TABLE 3

| | Thickness of Layer B [mm] | Temperature Difference [°C.] | Magnetic Property Br[KG] | (BH) [MGOe] max |
|---|---|---|---|---|
| Test 12 | 3.5 | 105 | 5.54 | 6.3 |
| Test 13 | 3.0 | 102 | 5.95 | 7.0 |
| Test 14 | 2.0 | 100 | 6.28 | 8.4 |
| Test 15 | 1.0 | 92 | 6.32 | 8.5 |
| Test 16 | 0.5 | 85 | 6.30 | 8.5 |

EXAMPLE 4

Next, in a die for an extrusion shown in FIG. 1, the length of the orientation section 108 of the die was varied, and magnets were produced by extrusion molding as similar to Example 1.

In this example, the magnetic powder and the polyamide resin were however mixed to make a volume ratio of the magnetic powder and the resin as 3:2. The magnetic field was made by charging a 200 A current to a 123 turn coil, and the shape of the moulded magnet by extrusion was a cylindrical with the outer diameter 30 mm and the inner diameter 28 mm.

The magnetic fields for the orientation at the orientation section when the length of the orientation section 108 was varied, are shown in Table 4 together with the magnetic property of the magnets extruded.

In this example, as to the temperature of the orientation section X and Y points, a heating and cooling was applied from both ends of the orientation section to make Y point always at 160° C. and X always at 250° C. However in case of the length at 5 mm, the temperature at x point was 240° C., and it was not able to get 250° C. The shape of the magnet molded had a $d^2/2D$ value at approximately 13 mm.

TABLE 4

| | Length [mm] | Magnetic Field [Koe] | Magnetic Performance Br[KG] | (BH) max |
|---|---|---|---|---|
| Test 17 | 25 | 5.0 | 3.70 | 2.7 |
| 18 | 15 | 9.3 | 4.93 | 5.5 |
| 19 | 13 | 11.1 | 5.95 | 7.5 |
| 20 | 10 | 13.3 | 6.15 | 8.0 |
| 21 | 5 | 15.0 | 6.12 | 7.9 |

From Table 4, the magnetic performance of the magnet drops extremely when the length of the orientation exceeds in 13 mm. This is because of an impossibility of an sufficient orientation of the magnetic powder by an increase of the length of the orientation section resulting a low magnetic field at the orientation section.

$$l < d^2/2D \qquad (1)$$

The above equation is an modified equation of the condition in which the orientation of the radial factor is sufficient ie $$fR = 2Dh/d^2 < 1,$$

by replacing h with L, and the results obtained almost have an agreement with the equation of (1). In case of a radial magnetic field molding by a press and an injection, there is a limitation on the height at around 13 mm for the magnet molded, but there is no such limitation on the magnet height in case of extrusion molding, and it was able to produce a magnet with a sufficient radial orientation even if its height was several ten mm.

EXAMPLE 5

Next the similar test to Example 4 was carried out by using the die shown in FIG. 2.

As to the die shown in FIG. 2, as similar to Example 2, the orientation section 108 of the die is devided into 3 layers of layer A 102b, layer B 102c and layer C 102b, 102c of layer B is a non-magnetic material PEEK of 0.5 mm thickness, and it has a structure that 102c of layer B comprising a different material is inserted in the center of the orientation section 108. 102b of layer A and layer C is a magnetic material, and a sum of these length is l'. Layer A and layer C were made as always the same thickness.

The magnetic field for the orientation and the change of the magnet performance when the magnets were molded by varying the length l' were examined, and the results were shown in Table 5.

The magnetic field for the orientation was a result observed at a passage which contacted with layer A 102b, and the shape of the molded magnet was a ring of the outer diameter 25 mm and the inner diameter 23 mm.

TABLE 5

|  | l' [mm] | Magnetic Field [KOe] | Magnetic Performance Br[KG] | (BH) max |
|---|---|---|---|---|
| Test 22 | 18 | 3.0 | 3.68 | 2.7 |
| 23 | 15 | 5.0 | 3.73 | 2.7 |
| 24 | 11 | 9.2 | 4.90 | 5.5 |
| 25 | 10 | 10.5 | 6.02 | 7.8 |
| 26 | 8 | 13.0 | 6.28 | 8.5 |
| 27 | 5 | 15.0 | 6.30 | 8.5 |
| 28 | 3 | 15.2 | 6.22 | 8.3 |

The temperatures at X and Y points were 160° C. and 280° C. respectively. The temperature at Y point raised when compared with Example 4, and this was due to a heat insulation effect between layer A-C by the insertion of PEEK in layer B resulting a security of the temperature difference.

There magnets produced herewith had $$d^2/2D = 10.6 \text{ [mm]}.$$

Even on the results of Table 5 when l' becomes 10.6 mm or more, the magnetic performance of the magnet produced drops remarkably as similar to Example 4. When it becomes 10.6 mm or less, it shows a value which is considered that the radial orientation is almost sufficient. The magnetic property is more improved than Example 4, and this is due to a further decrease of the resin viscosity at X point when compared with Example 4 because of a security of the temperature gradient between X-Y by a heat insulation effect of layer B. When the length of a magnetic material in the orientation section, ie the length of l' in which a magnetic field is charged to a magnetic powder, satisfies $$l' < d^2/2D,$$

a magnet with a sufficient radial orientation can be formed.

EXAMPLE 6

A magnetic powder having a same basic composition to Example 4 was mixed with a resin mainly comprising an epoxy resin to make a volume ratio of the magnetic powder and the resin as 3:2, a magnet was molded by extrusion from a die, and then the molded magnet was heated in an oven to cure it.

A die used in this example is shown in FIG. 3. Namely in this example it is constituted by divided sections in following order as an converging section 111, a heat insulating section 112, a heating section 113 and an orientating section 110 from a connecting section of the extrusion machine to an outlet of the orientation section. X, Y and Z are measuring points of temperature.

A compound extruded from an extrusion machine is converged at the converging section 111. The compound is further heated in the heating section 113 after passing through the heat insulating section 112, the magnetic powder is orientated in the orientating section 110 and a magnet is molded as its state by a solidification with cooling.

Next as for a die used in Comparative Example, there is no heat insulating section 112, and no distinction between the converging section 111 and the heating section 113, but the remainder is the same to the die of FIG. 3.

Figure 4:
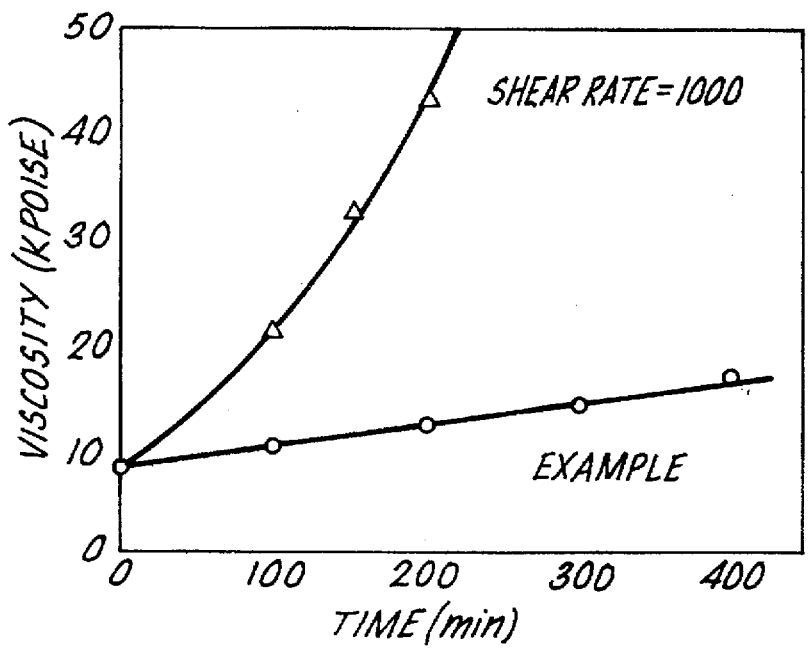
FIG. 4 shows a graph to exhibit a viscosity change of the compound by time.

A change of the compound viscoisty, when these dies are applied, is shown in FIG. 4.

The viscosity herewith measured is a value at 120° C. of a crushed material of an uncured magnet extruded through the die after charging in an extrusion machine.

The time of the axis of abscissa is time setting 0 minute when the charged compound first comes out from the die and magnets are sampled after it, and their viscosities are measured.

The temperature of the die at X, Y and Z points were 60° C., 150° C. and 120° respectively, the temperature of the die of Comparative Example at X, Y and Z points were 60° C., 150° C. and 160° C., and the extrusion speed of the magnet was 1 mm/sec.

As it is shown in FIG. 4, the compound viscosity increases largely by passing time in case that the die of comparative Example is used. It is considered that it was due to an initiation of cure of a part of the resin because of heating of the compound extruded from the extrusion machine even at 160° C. When the operation time exceeded. 4 hours, the extrusion molding was not able to continue. On the contrary in case of the die of Example, a section where it was heated at 150° C. was small resulting slight change of the viscosity by time.

Figure 5A:
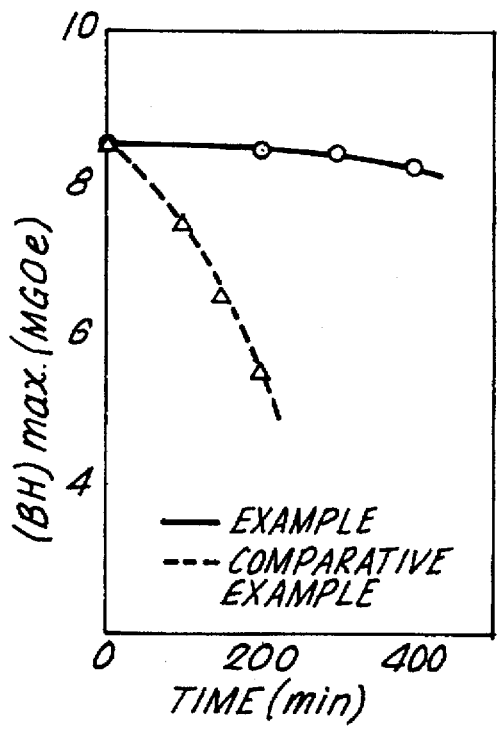
FIG. 5 (a) and (b) show graphs to exhibit a change of the magnetic performance when a die of Example 6 is used.
Figure 5B:
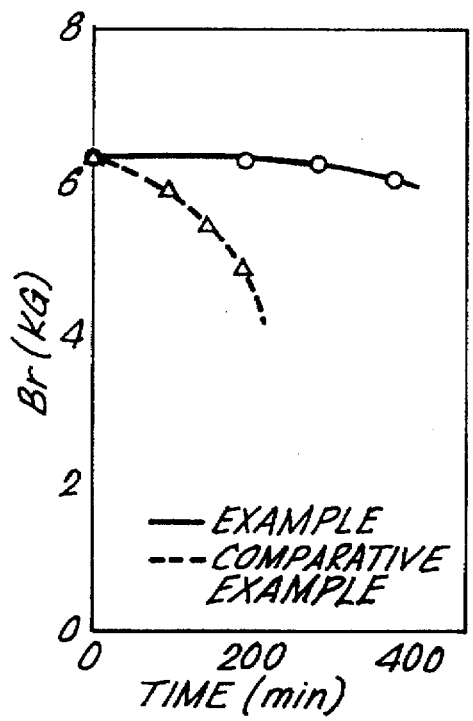
Figure 6:
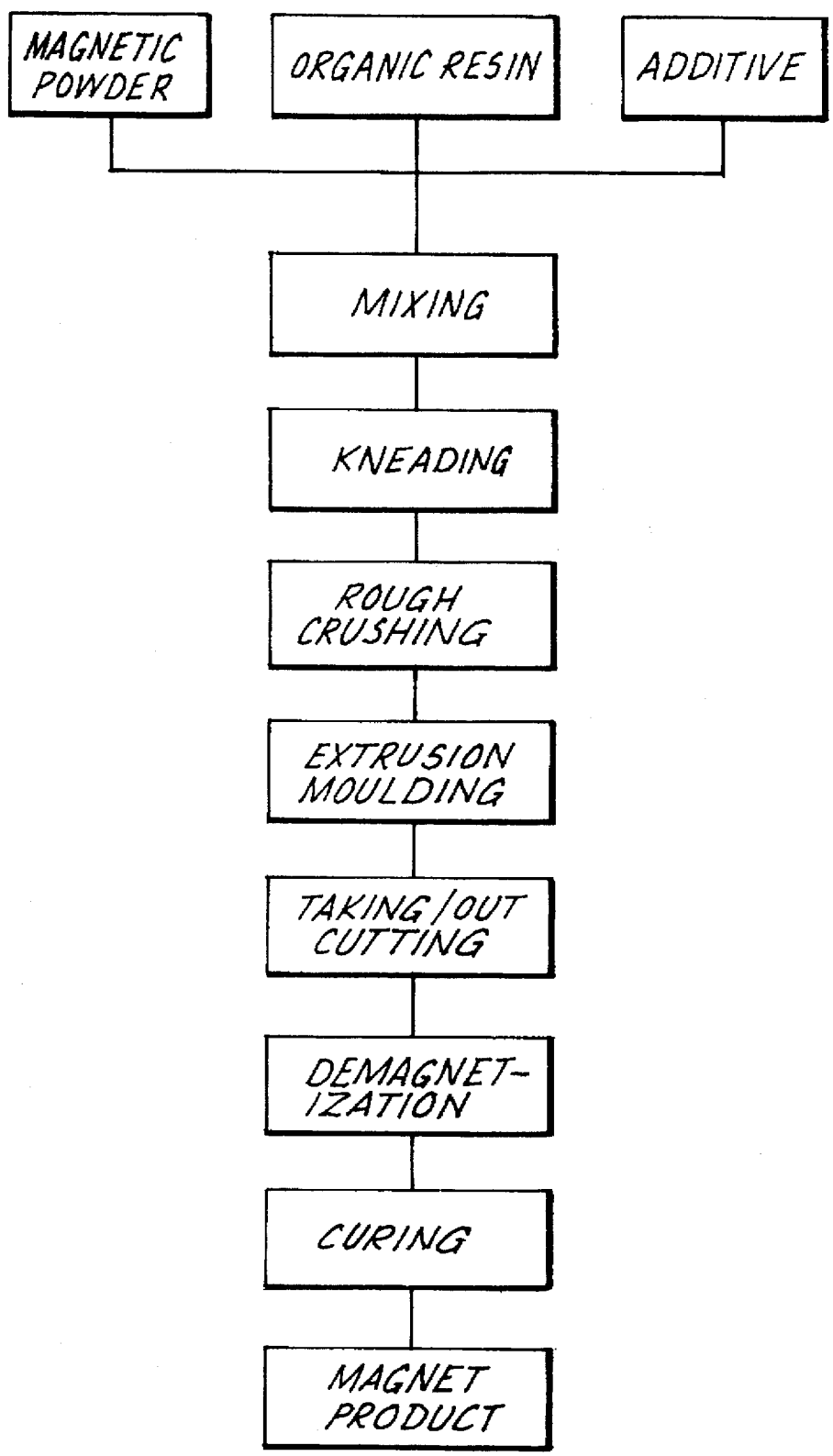
FIG. 6 is a process outline of a magnet.
Figure 7:
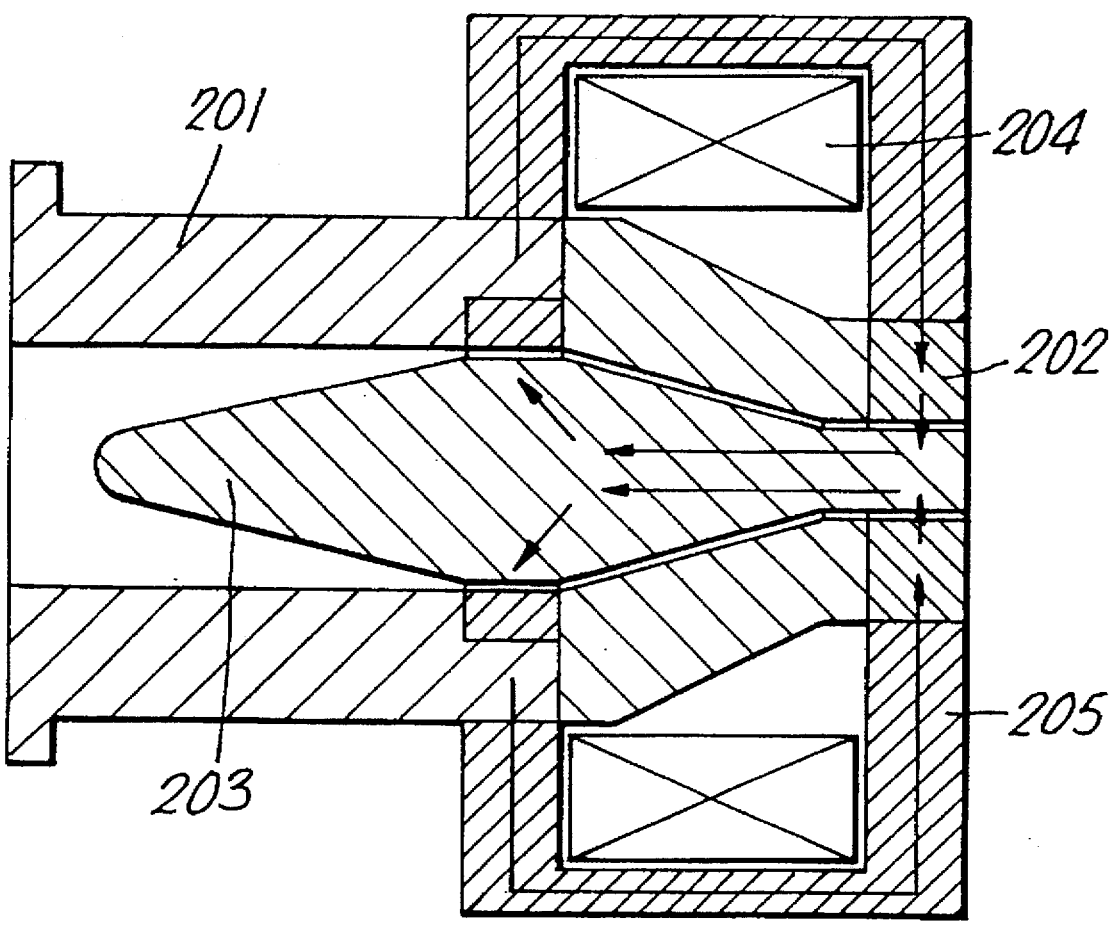
FIG. 7 and 8 are outline drawings of dies for conventional extrusion molding.

A change of the magnetic performance when these dies were used, are shown in FIG. 5 (a) and (b). The time of the axis of abscissa is the same as FIG. 4.

As is clear from Table 5, the magnetic performance suddenly drops by passing the time in case of Comparative Example. This was due to a decrease of degree of the orientation since the magnetic powder in the compound became difficult to orientate in progress of the elevation of the compound visicosity by time resulting a drop of the magnetic performance.

On the other hand, in case of Example, almost no change of the magnetic performance over time is observed, and a high magnetic performance is attained stably.

We claim:

1. A die for use in production of a resin bound type magnet by extrusion molding a molten mixture of magnetic powder and resin, orienting said magnetic powder in said molten mixture by a magnetic field and solidifying said molten mixture, wherein an orientation section is located at an outlet end part of said die at which magnetic field is applied to thereby orient said magnetic powder and wherein said orientation section comprises a magnetic material and a layer structure of at least two axially adjacent elements made of at least two different materials and wherein the layer structure comprises at least one middle layer made of a low thermal conductive material having a thermal conductivity at 20° C. of 0.01 cal/cm.sec°C. or less in part of said orientation section thereby increasing the thermal gradient which can be established across the operative length of the orientation section.

2. A die for extrusion molding as claimed in claim 1, wherein the material of the middle layer of the layer structure is composed of a non-magnetic material, and the axial thickness of the non-magnetic material is one half or less of the die axial length of said orientation section.

3. A die for use in production of a resin bound type magnet by extrusion molding a molten mixture of magnetic powder and resin, orienting said magnetic powder in said molten mixture by a magnetic field and solidifying said molten mixture, wherein an orientation section is located at an outlet end part of said die at which magnetic field is applied to thereby orient said magnetic powder and wherein said orientation section comprises a magnetic material characterized by the orientation section including a portion made of a low thermal conductive material having a thermal conductivity at 20° C. of 0.01 cal/cm.sec°C. or less thereby increasing the thermal gradient which can be established across the operative length of the orientation section, wherein the die is used for production of a cylindrical resin bound type magnet and wherein the orientation section has a cavity and the axial length L of the cavity of the orientation section satisfies the relationship $L<d^2/2D$ where d and D are the inner diameter and the outer diameter of the cavity of the orientation section, respectively.

4. A die for use in production of a resin bound type magnet by extrusion molding a molten mixture of magnetic powder and resin, orienting said magnetic powder in said molten mixture by a magnetic field and solidifying said molten mixture, wherein an orientation section is located at an outlet end part of said die at which magnetic field is applied to thereby orient said magnetic powder and wherein said orientation section comprises a magnetic material characterized by the orientation section including a portion made of a low thermal conductive material having a thermal conductivity at 20° C. of 0.01 cal/cm.sec°C. or less thereby increasing the thermal gradient which can be established across the operative length of the orientation section, wherein the die is used for production of a cylindrical resin bound type magnet and wherein a non-magnetic material is present in a part of the said orientation section and is surrounded by a magnetic material, said orientation section having a cavity, and wherein the total axial length of the magnetic material L' satisfies the relationship $L'<d^2/2D$ where d and D are the inner diameter and the outer diameter of the cavity of the orientation section, respectively.

* * * * *